(12) United States Patent
Glazewski

(10) Patent No.: US 7,303,673 B1
(45) Date of Patent: Dec. 4, 2007

(54) HIGH-PRESSURE SPIN-ON FILTER ASSEMBLY

(75) Inventor: James Michael Glazewski, Caelpmon, NC (US)

(73) Assignee: Wix Filtration Corp LLC, Gastonia, NC (US)

( * ) Notice: Subject to any disclaimer, the term of this patent is extended or adjusted under 35 U.S.C. 154(b) by 373 days.

(21) Appl. No.: 10/934,466

(22) Filed: Sep. 7, 2004

(51) Int. Cl.
B01D 35/30 (2006.01)

(52) U.S. Cl. .................. 210/232; 210/238; 210/443; 210/450

(58) Field of Classification Search ........ 210/DIG. 17, 210/232, 238, 443, 450
See application file for complete search history.

(56) References Cited

U.S. PATENT DOCUMENTS

| | | | |
|---|---|---|---|
| 4,160,738 A * | 7/1979 | Guter | 210/232 |
| 4,369,113 A | 1/1983 | Stifelman | |
| 4,743,374 A * | 5/1988 | Stifelman | 210/443 |
| 4,855,047 A * | 8/1989 | Firth | 210/232 |
| 4,859,328 A * | 8/1989 | Groezinger et al. | 210/232 |
| 5,116,499 A | 5/1992 | Deibel | |
| 5,118,417 A | 6/1992 | Deibel | |
| 5,342,519 A * | 8/1994 | Friedmann et al. | 210/232 |
| 5,879,543 A | 3/1999 | Amini | |
| 5,904,357 A | 5/1999 | Demirdogen et al. | |
| 5,906,736 A | 5/1999 | Bounnakhom et al. | |
| 5,928,513 A * | 7/1999 | Bradford | 210/443 |
| 5,996,810 A | 12/1999 | Bounnakhom et al. | |
| 6,006,924 A | 12/1999 | Sandford | |
| 6,045,693 A | 4/2000 | Miller et al. | |
| 6,177,003 B1 * | 1/2001 | Jainek et al. | 210/85 |
| 6,187,191 B1 * | 2/2001 | Koivula et al. | 210/440 |
| 6,227,381 B1 | 5/2001 | Koivula | |
| 6,499,605 B1 | 12/2002 | Koivula | |
| 6,554,140 B2 | 4/2003 | Steger, Jr. et al. | |
| 6,615,989 B2 | 9/2003 | Brown et al. | |
| 6,666,968 B2 | 12/2003 | Smith et al. | |

* cited by examiner

Primary Examiner—Krishnan Menon
Assistant Examiner—Benjamin Kurtz
(74) Attorney, Agent, or Firm—Honigman Miller Schwartz & Cohn LLP

(57) ABSTRACT

A high-pressure spin-on filter assembly is provided that utilizes a two-piece cover assembly to hold or sandwich the housing in place once the housing is folded over the inner cover member. This design allows for the outer cover member to be interchanged to fit multiple applications while making little or no change to the other components. Suitable gaskets are provided between the housing and two-piece cover assembly and the filter and cover assembly. The outer cover member may be changed to accommodate thread changes or gasket location changes.

42 Claims, 4 Drawing Sheets

HIGH-PRESSURE SPIN-ON FILTER ASSEMBLY

BACKGROUND OF THE INVENTION

1. Field of the Invention

The present invention relates generally to fluid filters of the spin-on type. More particularly, this invention concerns a reinforced spin-on filter incorporating a cover, which is connected to the housing by means of an inwardly folded lip to improve fatigue strength.

2. Description of Related Art

Spin-on filters have been employed heretofore in a variety of applications including hydraulic systems and engine lubrication systems. Such filters generally include a filter element within a can or housing having a cover or attachment plate at one end thereof by which the filter can be screwed onto or off of a filter head. A central opening and several surrounding openings in the cover direct fluid flow through the filter, which flow can be in either an inside/out or outside/in direction relative to the filter element. A circular gasket on the outside of the cover serves as the external seal between the filter and the filter head, while another circular gasket on the inside of the cover functions as the internal seal between the filter element and cover. A spring is often provided in the lower end of the housing to maintain the filter element in sealing engagement with the cover. Spin-on filters are usually intended to be used only once before removal and replacement.

Although satisfactory in low- and medium-pressure applications, most spin-on filters of the prior art have not been particularly suitable for use in high-pressure applications, such as in hydraulic transmission pumps, where spikes or surges up to about 1,000 psi can occur. Many of the spin-on filters currently available are adaptations of the type used in engine lubrication systems. The covers of such spin-on filters are typically constructed of a stamped steel-based disc including an extruded, relatively shallow, internally threaded neck portion by which the filter can be connected to a filter head. Flow openings are punched into the base disc around the neck portion. The lip at the open end of the housing is connected by means of a lock seam to the periphery of a secondary disc, which is also formed to serve as a seat for the external gasket. In spin-on filters of this type, any fatigue failure is most likely to occur at the rolled lock seam or at the spot welds. Any burst failure is most likely to occur either upon bending of the cover, which allows leakage past the external gasket, or upon unfolding of the rolled lock seam. The prior spin-on filters of this type have thus been susceptible to failure at the cover and/or at the connection between the cover and the housing.

Various attempts have been made to strengthen and otherwise increase the pressure capacities of the prior spin-on filters. Different materials and/or increased material thicknesses have been used, improved lock seams have been developed, and reinforcing profiles have been formed into the cover plates. These efforts have resulted in increasing the burst capacities of such spin-on filters up to about 500 psi, and have therefore been of some success; however, even filters of such capacity can be marginal in certain applications. In addition, reinforcing efforts of this type tend to increase the cost of such filters. It will be understood that manufacturing limitations and production economies can be important factors in the construction of such spin-on filters.

Prior art attempts to improve fatigue strength have the negative result of increasing manufacturing costs and limiting the versatility of the filter components.

There is thus a need for an improved reinforced spin-on filter of high pressure capacity and better fatigue rating.

SUMMARY OF INVENTION

The present invention comprises an improved high-strength spin-on filter which overcomes the foregoing and other difficulties associated with the prior art.

In accordance with invention, there is provided a high-strength spin-on filter comprising a generally cylindrical filter housing having an open end and a closed end. A generally cylindrical filter element is disposed within the housing. A cover is secured to the open end of the housing. The cover, which preferably is of two-piece construction, includes flow openings that terminate on opposite sides of the filter element inside the housing.

In the preferred embodiment, the two-piece cover includes an inner cover member and an outer cover member. During assembly, the inner cover member is disposed in the housing and the open end of the housing is folded inwardly over the rim of the inner cover member, whereby stresses are reacted in shear rather than bending. The outer cover member is then threaded or otherwise affixed to the inner cover member to lock or sandwich the folded portion of the housing.

As will be described herein, a high-pressure spin-on filter assembly is provided that utilizes a two-piece cover assembly to hold or sandwich the housing in place once the housing is folded over the inner cover member. This design permits an interchangeable outer cover member adapted to fit multiple applications while making little or no change to the other components. The outer cover member may be changed to accommodate different threads or gasket locations.

Other features and benefits of the present invention will be apparent to those of skill in the art in light of the following drawings and associated description.

DETAILED DESCRIPTION OF PREFERRED EMBODIMENT

Figure 1:
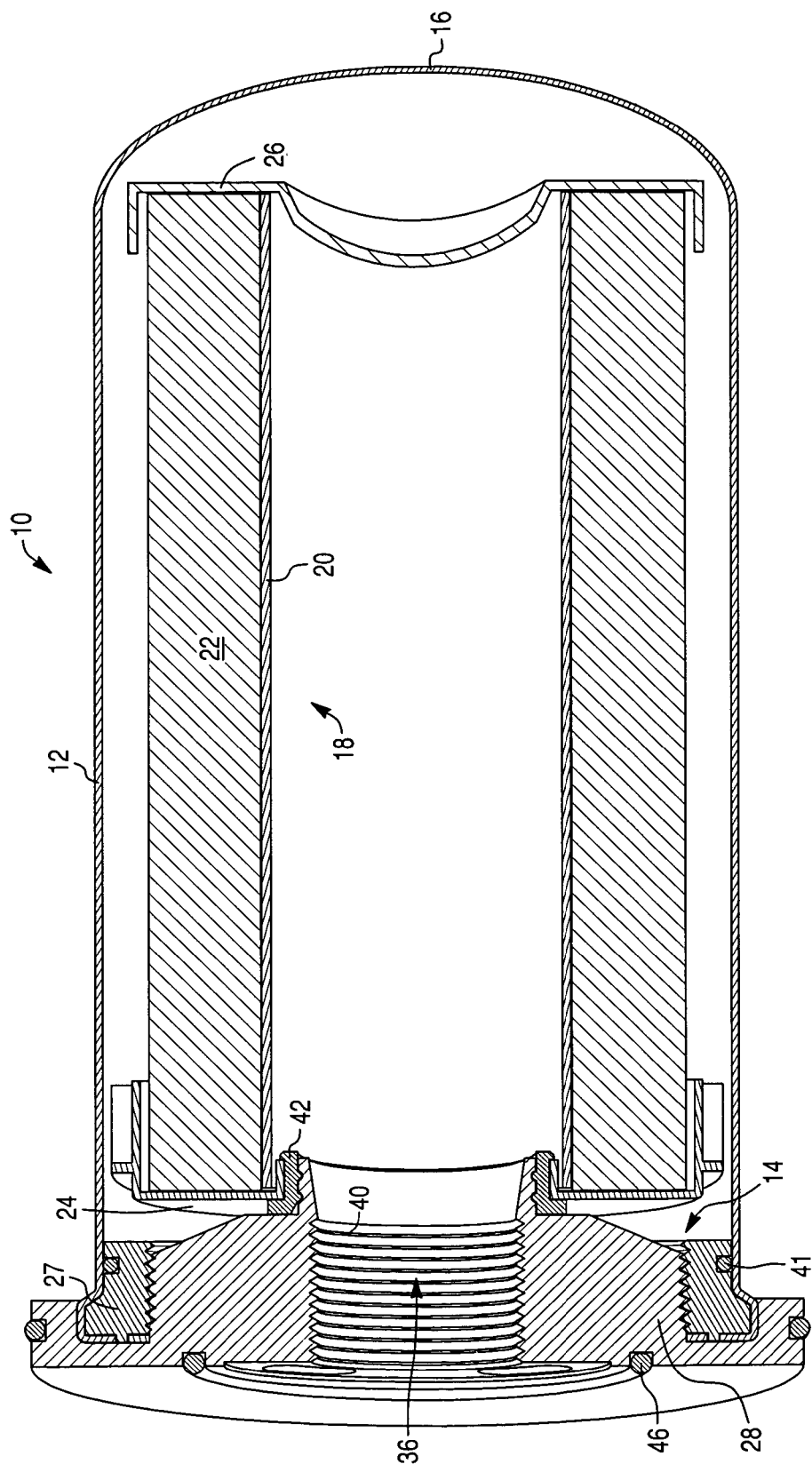
FIG. 1 is a cross-sectional view of the filter assembly according to the principles of the present invention.
Figure 2:
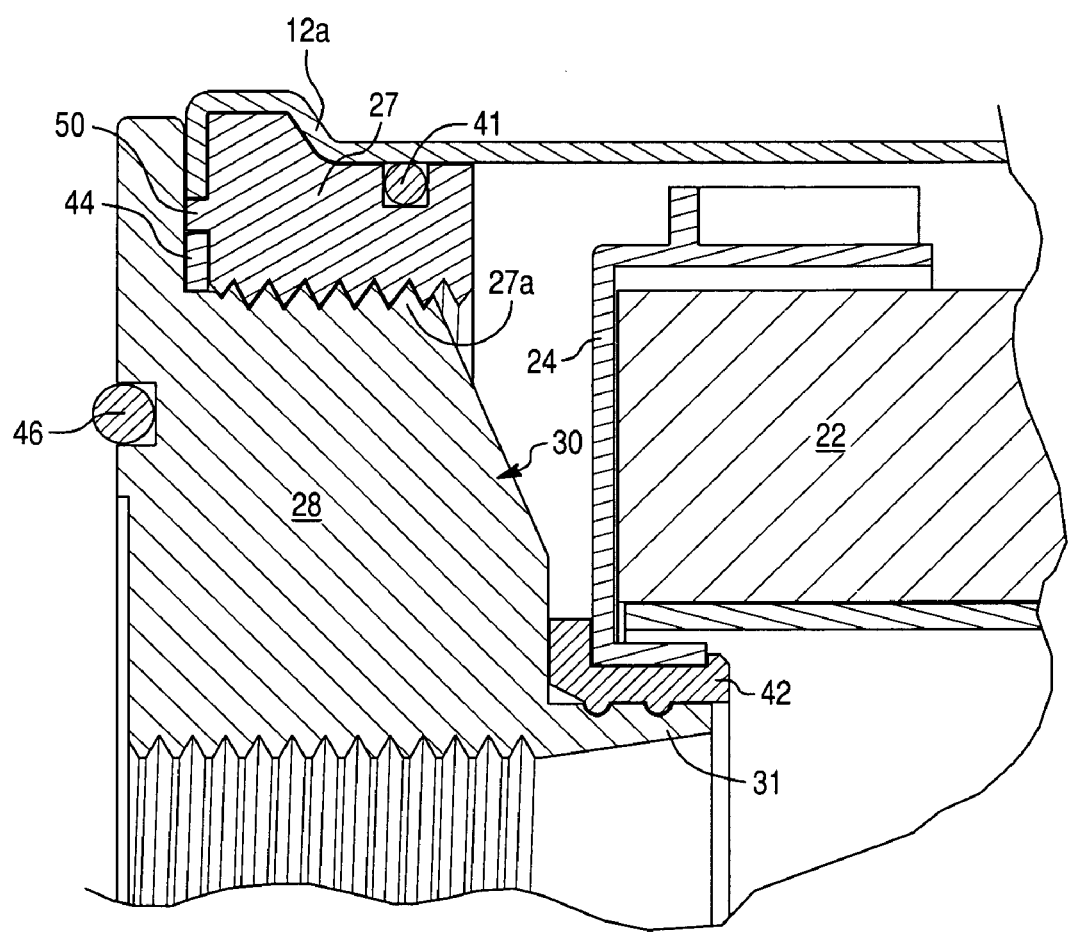
FIG. 2 is an enlarged partial sectional view showing the cover construction of the filter assembly shown in FIG. 1.

Referring to FIGS. 1 and 2, there is shown a spin-on fluid filter 10 incorporating a preferred embodiment of the invention. As will be explained more fully hereinafter, the filter 10 is particularly adapted for filtration of oil in hydrostatic transmissions and other systems characterized by cyclical high-pressure loads.

The filter 10 includes a generally cylindrical filter housing 12 having an open top end 14 and a closed bottom end 16. The housing 12 is a generally thin-walled construction, and is typically formed by stamping or drawing from metal such as steel or other suitable material. For example, housing 12 can be formed from deep drawn steel of about 0.042-0.046 wall thickness.

A filter element assembly 18 is positioned inside the filter chamber defined by housing 12. The filter element assembly 18 includes a perforated core 20 surrounded by a filter element 22, both of which are generally cylindrical and supported between a pair end pieces 24 and 26. The closed-bottom end piece 26 extends across and closes the bottom end of the perforated core 20, which can be paper or other suitable media, while the upper end piece 24 includes a central opening for receiving a portion of an outer cover member 27, 28 secured within the open end 14 of the housing 12. The filter element 22 can be potted in place or otherwise secured between the end pieces 24 and 26 as shown. In the preferred embodiment, the housing 12 supports the filter element assembly 18 at the outside diameter ends of the closed-bottom end piece 26.

In the preferred embodiment, the filter 10 includes a two-piece cover defined by an inner cover member 27 and an outer cover member 28.

The inner cover member 27 is an annular member with a threaded internal bore 27a. A circumferential groove is provided in the outer surface of the cover member 27 to receive a seal providing a sealing interface between the inner cover member 27 and the housing 12.

Figure 3:
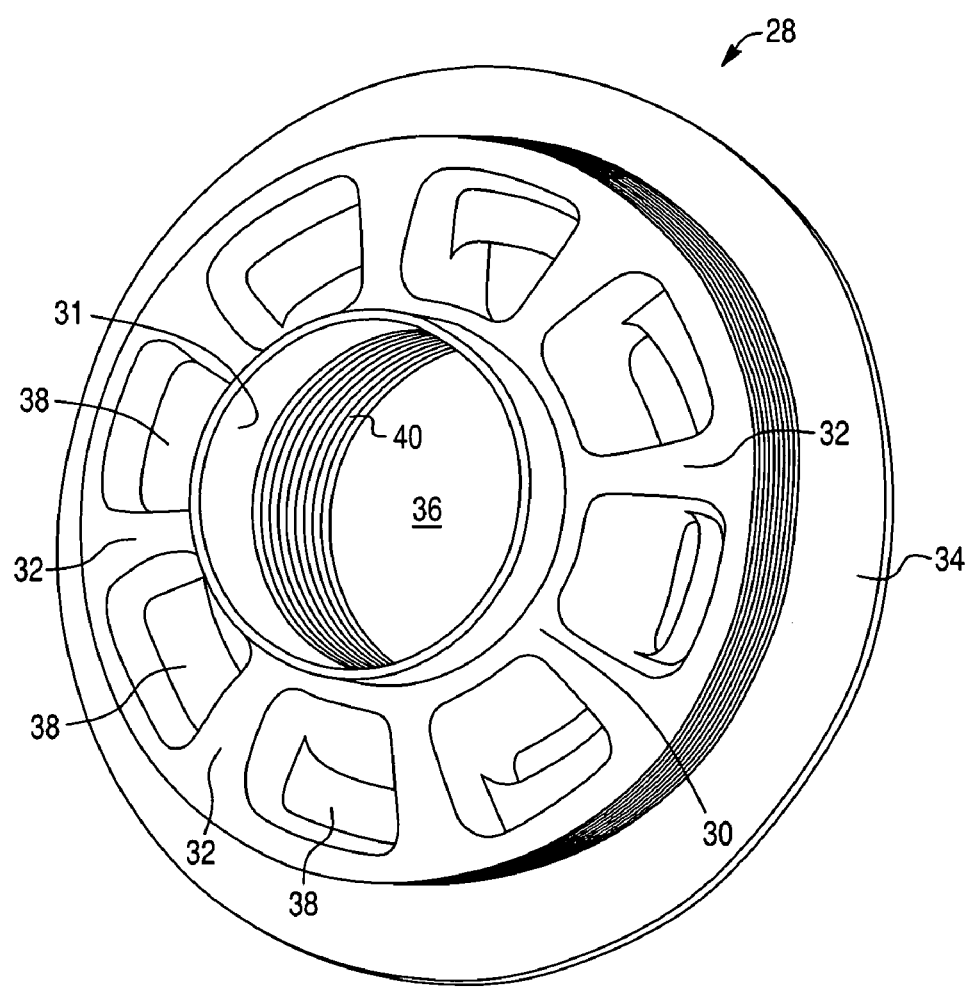
FIG. 3 is a perspective view of the outer cover member of the present invention.

As illustrated in FIG. 3, the outer cover member 28 includes a central hub 30 which is interconnected by a plurality of radial webs or ribs 32 with a circular outer rim 34. As illustrated, outer cover member 28 includes eight ribs 32 at equally spaced intervals, although the precise number of ribs and spacing therebetween are not critical to practice of the invention. The hub 30 defines an axial opening 36 extending through cover member 28 and a threaded outer peripheral surface for mating with the internal bore 27a of the inner cover member 27. Openings 38 are also defined in the cover member 28 between hub 30, ribs 32 and rim 34. The openings 36 and 38 serve as flow ports whereby fluid to be filtered is circulated through filter 10 in an outside/in flow direction through the filter element assembly 18. Threads 40 are provided on the upper inside surface of the hub 30 for connecting the filter 10 to a filter head (not shown). The cover members 27, 28 are preferably formed by casting or the like from metal, such as aluminum, or other suitable material, into rigid integral units.

Those of skill in the art will recognize that the construction shown in FIGS. 1 and 2 provide a filter where the structure and figuration of the outer cover member 28 may be changed without changing other components of the filter 10.

Seals are provided on the outer cover member 28 at various locations. A seal 42 is located on the filter attachment portion 31 of the outer cover member 28 between the hub 30 and the upper end piece 24 of the filter assembly 18. Another seal 44 is located between outer cover member 28 and the inner cover member 27. Yet another seal 46 is located in a groove on the upper end of the cover member 28 for external sealing purposes between the filter 10 and the filter head (not shown).

The cover member(s) 27, 28 and housing 12 are secured together by a folded connection of the open end of the housing 12, which is sandwiched between the inner cover member 27 and the outer cover member 28. In one preferred embodiment, a mechanical interlocking means, in the form of a locking tang 50, is provided to interlock the folded portion of the housing 12 to the cover member 27, 28. As will be understood by those of skill in the art, other fastening means such as adhesive, welding, etc. may be employed to secure the housing 12 against movement relative to the cover member 27, 28.

The filter is assembled in the following manner. The filter element assembly 18 is placed in the can or housing 12 with the closed bottom end piece 26 down. The housing 12 preferably supports the filter element assembly 18 at the outside diameter ends of the closed-bottom end piece 26. The inner cover member 27 is then placed in the unfolded housing 12. In the preferred design, the inner cover member 27 is seated onto a step 12a formed in the housing 12 and an o-ring seal 41 is disposed between the inner cover member 27 and housing 12 to seal the housing to the cover member. The housing 12 is then folded or formed over the inner cover member 27. Epoxy may be installed between the housing 12 and the inner cover member 27 to keep these parts from rotating relative to one another.

A gasket 44 is then placed on the top of the inner cover member 27, and the outer cover member 38 is threaded onto the inner cover member 27. The gasket 44 provides a seal between the inner and outer cover members 27, 28. In the process, the folded portion of the housing 12 is also cinched or sandwiched between the cover members 27, 28. An outer sealing gasket 46 is then disposed on the outer cover member 28 to seal the filer assembly 10 to the engine.

Figure 4:
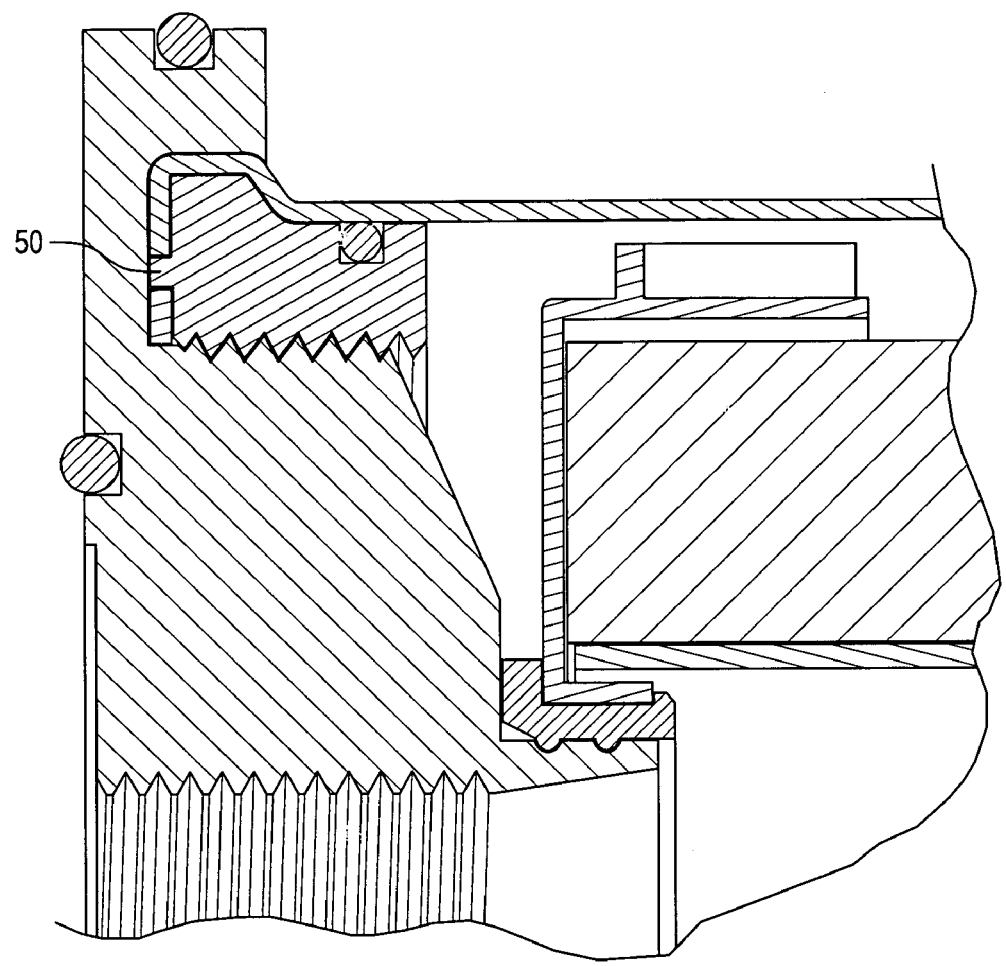
FIG. 4 is an enlarged partial sectional view showing an alternate embodiment of the cover construction of the filter assembly shown in FIG. 1.

In an alternate embodiment shown in FIG. 4, the outer cover member 28 may be thickened to accommodate various outer sealing gasket locations with changing other filter components. In addition, the outer cover member 28 may be formed to include a gasket on the outside diameter of the filter whereby the outer cover member may at least partly wrap around the housing 12 as shown in FIG. 4. Locking tangs 50 may also be provided on the inner cover member 27 to interlock the folded portion of the housing 12 to the inner cover member 27.

From the foregoing, it will thus be apparent that the present invention comprises an improved high-strength spin-on filter having several advantages over the prior art, including but not limited to a burst pressure of over 800 psi. Improved fatigue strength without additional parts, manufacturing steps and increased cost are but some of the advantages. Other advantages will be evident to those skilled in the art.

Although particular embodiments of the invention have been illustrated in the accompanying Drawing and described in the foregoing Detailed Description, it will be understood that the invention is not limited only to the embodiments disclosed, but is intended to embrace any alternatives, equivalents, modifications and/or rearrangements of elements falling within the scope of the invention as defined by the following claims.

What is claimed is:

1. A filter assembly, comprising:
   a housing defined by a closed end and a sidewall that defines a chamber and an open end;
   a filter element disposed within said chamber;
   a two-piece rigid unitary cover disposed in the open end of said housing, said two-piece rigid unitary cover including a first cover member and a second cover member, wherein the open end of said housing includes a radial portion that extends radially inwardly and is disposed adjacent a substantially flat axial end surface of the first cover member, wherein said second cover member is fixed to said first cover member to thereby sandwich said radial portion therebetween, wherein the first cover member includes at least one locking tang extending axially away from said substantially flat axial end surface, wherein said radial portion is disposed adjacent the substantially flat axial end surface and an outer radial surface of the at least one locking tang; and a seal disposed between the first cover member and the second cover member, wherein the seal is disposed adjacent the substantially flat axial end surface of the first cover member and an inner radial surface of the at least one locking tang, wherein said second cover member includes an outer radial surface, wherein said second cover member includes a first flange portion extending radially away from the outer radial surface and past said sidewall of said housing to define a cantilevered portion with respect to said housing, wherein the first flange portion defines an outer axial surface and an inner axial surface, wherein the inner axial surface axially engages said seal, an axial end surface of the at least one locking tang, and an axial end surface of the radial portion, wherein said second cover member includes a second flange portion extending axially away from the inner axial surface of the first flange portion proximate the cantilevered portion, wherein the second flange portion is positioned adjacent said sidewall of said housing proximate said open end.

2. The filter assembly according to claim 1, wherein said first cover member comprises a threaded inner bore.

3. The filter assembly according to claim 2, wherein an inner diameter defined by said threaded inner bore of said first cover member is smaller than an outer diameter of said filter element.

4. The filter assembly according to claim 2, wherein said second cover member comprises a hub portion having an outer threaded peripheral surface adapter to mate with said threaded inner bore.

5. The filter assembly according to claim 1, further comprising an epoxy disposed between said radial portion and said first cover member.

6. The filter assembly according to claim 1, further comprising a sealing gasket interposed between said second cover member and said filter element.

7. The filter assembly according to claim 1, wherein said housing and filter element are formed as a generally cylindrical shape.

8. The filter assembly according to claim 1, further comprising a second seal engaged between said first cover member and said housing.

9. The filter assembly according to claim 8, wherein said second seal is disposed in a peripheral groove formed in said first cover member.

10. The filter assembly according to claim 1, wherein the second flange portion defines an outer radial surface, wherein the outer radial surface of the second flange portion includes a circumferential groove.

11. The filter assembly according to claim 10, further comprising a gasket disposed in the circumferential groove.

12. A cover for a filter assembly, comprising:
a first cover member including
an outer radial surface, and
a first flange portion extending radially away from the outer radial surface,
wherein the first flange portion defines an outer axial surface and an inner axial surface; and
a second cover member including
an inner radial surface,
an axial end surface, and
a portion extending axially away from the axial end surface of the second cover member, wherein the outer radial surface of the first cover member is joined to the inner radial surface of the second cover member, wherein an axial surface of the portion extending axially away from the axial end surface of the second cover member engages said inner axial end surface of the first flange portion of the first cover member.

13. The cover for a filter assembly according to claim 12, wherein the engagement of the axial surface of the portion and the inner axial end surface of the first flange portion defines, between the first cover member and the second cover member, an inner radial gap, and an outer radial gap.

14. The cover for a filter assembly according to claim 13 further comprising a gasket disposed in the inner radial gap to axially seal the inner and outer radial surfaces of the first and second cover members.

15. The cover for a filter assembly according to claim 12, wherein the outer and inner radial surfaces of the first and second cover members are defined by corresponding threaded surfaces.

16. The cover for a filter assembly according to claim 12, wherein said first cover member comprises a threaded inner bore for connecting to a filter head.

17. The cover for a filter assembly according to claim 12, wherein said first cover member comprises a hub portion including a plurality of radial ribs that define a plurality of fluid flow ports whereby fluid to be filtered in a filter housing is circulated in an outside/in flow direction.

18. The cover for a filter assembly according to claim 12, wherein the first flange portion extends radially away past an outer radial surface of the second cover member to define a cantilevered portion with respect to the second cover member, wherein the first cover member includes a second flange portion extending axially away from the inner axial surface of the first flange portion proximate the cantilevered portion.

19. The cover for a filter assembly according to claim 18, wherein the second flange portion defines an outer radial surface, wherein the outer radial surface of the second flange portion includes a circumferential groove.

20. The cover for a filter assembly according to claim 19, further comprising a gasket disposed in the circumferential groove.

21. A cover for a filter assembly, comprising:
a first cover member including
an outer radial surface,
a first flange portion extending radially away from the outer radial surface,
wherein the first flange portion defines an outer axial surface, and an inner axial surface,
a second flange portion extending axially away from the inner axial surface of the first flange portion; and
a second cover member including
an inner radial surface, wherein the outer radial surface of the first cover member is joined to the inner radial surface of the second cover member,
an axial end surface, and
an axial portion extending axially away from the axial end surface of the second cover member, wherein an axial surface of the axial portion comes together with and contacts the inner axial surface of the first flange portion of the first cover member.

22. The cover for a filter assembly according to claim 21, wherein the coming together and contacting of the axial surface of the axial portion and the inner axial surface of the first flange portion defines,
an inner radial gap, and
an outer radial gap, wherein the inner radial gap and the outer radial gap are located between the first flange member and the second cover member, and an outer axial gap, wherein the outer axial gap is located between the second flange member and the second cover member.

23. The cover for a filter assembly according to claim 22 further comprising a gasket disposed in the inner radial gap to axially seal the inner and outer radial surfaces of the first and second cover members.

24. The cover for a filter assembly according to claim 21, wherein the outer and inner radial surfaces are defined by corresponding threaded surfaces.

25. The cover for a filter assembly according to claim 21, wherein said first cover member comprises a threaded inner bore for connecting to a filter head.

26. The cover for a filter assembly according to claim 21, wherein said first cover member comprises a hub portion including a plurality of radial ribs that define a plurality of fluid flow ports whereby fluid to be filtered in a filter housing is circulated in an outside/in flow direction.

27. The cover for a filter assembly according to claim 21, wherein the first flange portion extends past an outer radial surface of the second cover member to define a cantilevered portion with respect to the second cover member, wherein the second flange portion extends from inner axial surface of the first flange portion proximate the cantilevered portion, wherein the second flange portion defines an outer radial surface.

28. The cover for a filter assembly according to claim 27, wherein the outer radial surface of the second flange portion includes a circumferential groove.

29. The cover for a filter assembly according to claim 28, further comprising a gasket disposed in the circumferential groove.

30. A filter assembly, comprising:
a housing including a chamber, wherein the housing is defined by a closed bottom portion and a circumferential end defining an opening that provides access to the chamber, wherein said circumferential end of said housing is defined by an inwardly-projecting radial portion;
a first cover member disposed in the opening, wherein the first cover member includes
an inner radial surface,
an outer radial surface,
an axial end surface, and
a protrusion extending axially away from the axial end surface of the first cover member, wherein the protrusion is defined by
an axial end surface,
an outer radial surface, and
an inner radial surface, wherein said inwardly-projecting radial portion of said circumferential end of said housing is disposed adjacent the axial end surface of the first cover member and the outer radial surface of the protrusion; and
a second cover member disposed in the opening, wherein the second cover member includes an outer radial surface connected to said inner radial surface of said first cover member.

31. The filter assembly according to claim 30, wherein the second cover member includes a first flange portion extending radially away from the outer radial surface of the second cover member, wherein the first flange portion is defined by
an inner axial surface, and
an outer axial surface, wherein said axial end surface of said protrusion comes together with and contacts the inner axial surface of the first flange portion.

32. The filter assembly according to claim 31, wherein the coming together with and contacting of the axial surface of the protrusion and the inner axial surface of the first flange portion defines, between the first cover member and the second cover member, an inner radial gap, and an outer radial gap.

33. The filter assembly according to claim 32 further comprising:
a first seal disposed in the inner radial gap to axially seal the inner and outer radial surfaces of the first and second cover members.

34. The filter assembly according to claim 33 further comprising a filter element disposed within said chamber, wherein said filter element includes an upper end piece proximate the second cover member.

35. The filter assembly according to claim 34 further comprising:
a second seal disposed between said upper end piece and said second cover member;
a third seal disposed between the first cover member and the housing, wherein the third seal is disposed in a recess formed in the outer radial surface of the first cover member; and
a fourth seal disposed in a recess formed in an outer axial surface of the second cover member.

36. The filter assembly according to claim 35, wherein the circumferential end defines a step portion that extends radially away from the closed bottom portion, wherein the first cover member includes a shoulder portion extending radially away from said outer radial surface that correspondingly mates with said step portion of the housing.

37. The filter assembly according to claim 36, wherein the second cover member includes a second flange portion extending axially away from the inner axial surface of the first flange portion, wherein the second flange portion comes together with and contacts an outer axial surface of the step portion.

38. The filter assembly according to claim 37 further comprising:
a fifth seal disposed in a recess formed in an outer radial surface of the second flange portion.

39. The filter assembly according to claim 37, wherein the first flange portion extends past said outer radial surface of said first cover member to define a cantilevered portion with respect to said first cover member, wherein said second flange portion extends from said inner axial surface of said first flange portion proximate the cantilevered portion.

40. The filter assembly according to claim 31, wherein the outer radial surface of the second cover member and inner radial surface of the first cover member are defined by corresponding threaded surfaces.

41. The filter assembly according to claim 31, wherein said first cover member comprises a threaded inner bore for connecting to a filter head.

42. The filter assembly according to claim 31, wherein said first cover member comprises a hub portion including a plurality of radial ribs that define a plurality of fluid flow ports whereby fluid to be filtered in a filter housing is circulated in an outside/in flow direction.

* * * * *